(12) United States Patent
Gu et al.

(10) Patent No.: US 10,738,144 B2
(45) Date of Patent: Aug. 11, 2020

(54) FLAME-RETARDANT BISMALEIMIDE RESIN AND PREPARATION METHOD THEREOF

(71) Applicant: SOOCHOW UNIVERSITY, Suzhou (CN)

(72) Inventors: Aijuan Gu, Suzhou (CN); Jiatao Miao, Suzhou (CN); Guozheng Liang, Suzhou (CN); Li Yuan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 119 days.

(21) Appl. No.: 16/314,907

(22) PCT Filed: Dec. 3, 2016

(86) PCT No.: PCT/CN2016/108468
§ 371 (c)(1),
(2) Date: Jan. 3, 2019

(87) PCT Pub. No.: WO2018/098830
PCT Pub. Date: Jun. 7, 2018

(65) Prior Publication Data
US 2019/0309113 A1 Oct. 10, 2019

(51) Int. Cl.
*C08F 222/40* (2006.01)
*C09K 21/14* (2006.01)
*C08G 73/10* (2006.01)

(52) U.S. Cl.
CPC .......... *C08F 222/40* (2013.01); *C08G 73/10* (2013.01); *C09K 21/14* (2013.01); *C08F 222/404* (2020.02)

(58) Field of Classification Search
CPC .... C08F 222/40; C08F 222/404; C08G 73/10; C09K 21/14

(Continued)

(56) References Cited

U.S. PATENT DOCUMENTS

| | | | |
|---|---|---|---|
| 4,853,449 A | * | 8/1989 | Domeier ............... C08F 222/40 526/259 |
| 8,217,099 B2 | | 7/2012 | He et al. |
| 2011/0147646 A1 | | 6/2011 | Tseng et al. |

FOREIGN PATENT DOCUMENTS

| | | |
|---|---|---|
| CN | 101974226 A | 2/2011 |
| CN | 105801858 A | 7/2016 |
| JP | 5105657 B2 | 12/2012 |

* cited by examiner

*Primary Examiner* — William K Cheung
(74) *Attorney, Agent, or Firm* — SZDC Law PC

(57) ABSTRACT

Disclosed are a flame-retardant bismaleimide resin and a preparation method thereof comprising: forming an eugenol salt suspensoid from a whole biomass eugenol in the present of a strong alkali metal base, adding dropwisely a solution of phosphorus oxychloride in methyl chloride to react to obtain a biomass-based phosphate flame-retardant; mixing bismaleimide, 2,2'-diallylbisphenol with the obtained phosphate, curing and posttreating to obtain the flame-retardant bismaleimide resin. Compared with petroleum-based bismaleimide resin, the flame-retardant bismaleimide resin prepared by the present invention is obtained from eugenol derived from biomass, and the raw material is green and renewable. It maintains mechanical properties and processing properties of the petroleum-based bismaleimide resin and has an excellent flame-retardant property. The preparation method provided by the invention has the advantages of low cost and simple production process, and has wide application prospect in the fields of aerospace, electronic information, electrical insulation and the like.

5 Claims, 4 Drawing Sheets

Bio-based eugenol

Bio-based phosphate (58) Field of Classification Search
USPC .......................................................... 525/538
See application file for complete search history.

FLAME-RETARDANT BISMALEIMIDE RESIN AND PREPARATION METHOD THEREOF

This application is the National Stage Application of PCT/CN2016/108468, filed on Dec. 3, 2016.

FIELD OF THE INVENTION

The present invention relates to a kind of flame retarding bismaleimide resin and is preparation method, in particular to a kind of bismaleimide resin modified by a bio-based phosphate prepared from green and renewable biomass source. It belongs to technical fields of chemical engineering and polymer materials.

BACKGROUND OF THE INVENTION

As a representative high performance thermosetting resin, bismaleimide (BMI) resin has outstanding heat resistance, dielectric properties, wet/hot resistance and excellent mechanical properties, chemical resistance, radiation resistance, abrasion resistance and dimensional stability, so it has broad application prospects in many cutting-edge fields including aerospace, electrical insulation, new energy and so on. Unfortunately, the use of bismaleimide resin is limited to a large extent due to its inherent weaknesses such as high melting point, narrow processing window and big brittleness of cured resin. Therefore, in the past, the studies of BMI resin mainly focused on improving the processing property and toughness of BMI resin.

At present, the most often used and commercialized BMI monomer is N,N'-(4,4'-methylenediphenyl) dimaleimide (BDM), and its most effective modifiers are allyl phenyl compounds. Researches have shown that allyl compounds can modify BDM by their reactions through "Ene" and "Diels-Alder" reactions, and the modified BDM resin has improved processing property and toughness. 2-2'-Diallyl bisphenol A (DBA) is the mostly often used allyl phenyl modifier for BDM, DBA is usually synthesized from diallyl bisphenol A ether (BBE) through Claisen rearrangement, while BBE is predominantly synthesized through the reaction between bisphenol A and chloropropene or bromopropylene that is mainly derived from petroleum and coal resources. As bisphenol A has a similar structure with estrogen, so using bisphenol A during production process or daily life will increase the risks of reducing fertility as well as increasing diseases and cancers. Therefore, there is a growing demand for producing materials without bisphenol A. Meanwhile, a large amount of DBA has been used for modifying BDM, moreover, the synthesis of DBA is completely dependent on petroleum-coal resources based bisphenol A and chloropropene or bromopropylene, this does not match with the concept of green and sustainable development. Therefore, looking for a green and renewable biomass material for modifying bismaleimide resin is a task which brooks no delay.

With the rapid development of technology and industry, the materials with only high performance can't meet demand, multi-functionalization of materials has attracted great interests. For example, the flame retardancy of polymers has gained worldwide attentions in recent years. Similar as most polymers, BMI resin also has poor flame retardancy, which greatly limits its application in the high-end field.

Among the existing flame retardants for polymer materials, phosphorus-containing flame retardants have been widely used due to their low smoke, low toxicity, low corrosive and good flame retarding properties. Phosphate and phosphonate, both of which have similar properties, are the most widely used organic phosphorus flame retardants. But phosphates are mostly viscous liquids, when they are added into resins as additive flame retardants some problems such as volatility and undesirable compatibility with the resins arise. Up-to-date, no technical proposal on modifying BMI with bio-based phosphate flame retardants has been reported so far.

SUMMARY OF THE INVENTION

In order to overcome the disadvantages of technology on existing functional bismaleimide resins, this invention provides a new kind of flame retarding bismaleimide resins modified by a green and renewable phosphate flame retardant and their preparation method.

In order to achieve above purpose, the technical solution adopted by this invention is providing the preparation method of a kind of flame retarding bismaleimide resin, comprising the following steps:

(1) at a temperature of 0.5 to 4.5° C., by mole basis, 300 to 400 parts of alkali metal alkali and 180 to 280 parts of water are uniformly mixed to obtain a paste A; 300 to 400 parts of eugenol is dissolved in 1500 to 2600 parts of methyl chloride to obtain a eugenol methyl chloride solution, which is then added dropwise to the paste A under stirring to obtain eugenol salt colloid B; 100 parts of phosphorus oxychloride is dissolved in 800 to 1600 parts of methyl chloride to get phosphorus oxychloride solution, which is then slowly dropped into said eugenol salt colloid B within 2 to 4 h at 0 to 30° C.; the mixture continues to react for 2 to 4 h; the organic layer is extracted by alkali metal alkali solution, followed by washing, drying and removing the solvent by rotary evaporation, successively, to get a light yellow liquid, which is bio-based phosphate flame retardant;

(2) at a temperature 20 to 30° C., by mole basis, 100 parts of bismaleimide, 0 to 84.5 parts of 2,2'-diallyl bisphenol A, and 1 to 75 parts of bio-based phosphate are mixed, the mixture is stirred at a constant temperature of 130 to 145° C. to get a transparent liquid, which is then cured and post-cured to obtain a flame retarding bismaleimide resin.

In the present invention, said alkali metal alkali is one of sodium hydroxide, potassium hydroxide, or any combination thereof.

Said methyl chloride is one of dichloromethane, trichloromethane, or any combination thereof.

Said bismaleimide is one of N,N'-(4,4'-methylenediphenyl) dimaleimide, N, N'-(4,4'-diphenyl ether) dimaleimide, or any combination thereof.

The technical solution of the present invention also includes a flame-retardant bismaleimide resin prepared by the above preparation method.

Compared with the prior arts, this invention has following advantages:

1. Unlike the existed art, the bio-based phosphate described in this invention is synthesized with renewable biomass eugenol as raw material, so the bio-based phosphate has high biomass content (91.2%), and it can replace 2,2'-diallyl bisphenol A and bisphenol A diallyl ether that are dependent on petroleum and coal resources as well as petroleum-based chloropropene or bromopropene, and consequently, reducing the dependence of bismaleimide resins on petroleum and coal resources. Even more beneficially, eugenol is a renewable biomass material with low toxicity and relatively low cost (about US$5 per kilogram).

2. Unlike traditional phosphate flame retardants, the bio-based phosphate provided by this invention contains allyl groups that can copolymerize with BMI, solving the problems such as volatility and undesirable compatibility of phosphate as an additive flame retardant for resins, this is conducive to fully play the flame retarding role, and also makes the material foundation for further improving the performance of BMI resins through modification by phosphate.

3. The flame retarding bismaleimide resins provided in this invention have excellent flame retardancy, mechanical properties and process-ability.

4. The modified bismaleimide resins with good flame retardancy provided in this invention is green and environmental protection, and the preparation process is simple, controllable and easy to be industrialized.

DETAILED DESCRIPTION OF THE INVENTION

The technical solution of this invention will be further described below with the accompanying figures and examples.

Example 1

1) Synthesis of Bio-Based Phosphate

Figure 1:
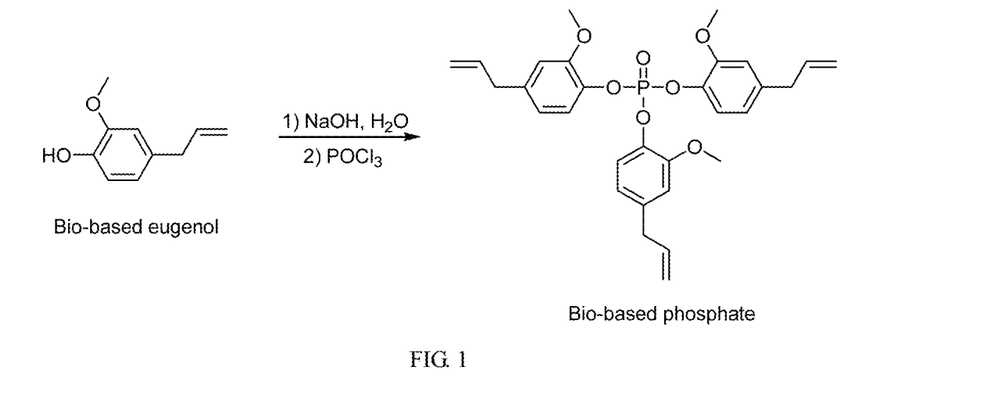
FIG. 1 is synthesis of bio-based phosphate in Example 1 of this invention.

FIG. 1 shows the synthesis reaction formula of bio-based phosphate prepared in this invention, which is a phosphate esterification reaction; in this example, the method is described as following: 36.0 g sodium hydroxide and 10 mL water are mixed in a reaction vessel at 1±0.5° C. to obtain a paste A. 147.8 g eugenol is dissolved in 300 mL dichloromethane to obtain a solution of eugenol dichloromethane, and then the mixture is added dropwise to the paste A with stirring to prepare eugenol salt colloid B. 46.0 g phosphorus oxychloride is dissolved in 200 mL dichloromethane solution to get a phosphorus oxychloride/dichloromethane solution, which is then is slowly drop into above eugenol salt colloid B within 2 h at 0° C. The mixture maintained at 0° C. for 2 h. After the completion of the reaction, 120 g 20% aqueous solution of sodium hydroxide is added into the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant, its $^1$H-NMR, $^{13}$C-NMR and $^{31}$P-NMR spectra are shown in FIGS. 2, 3 and 4, respectively.

Figure 5:
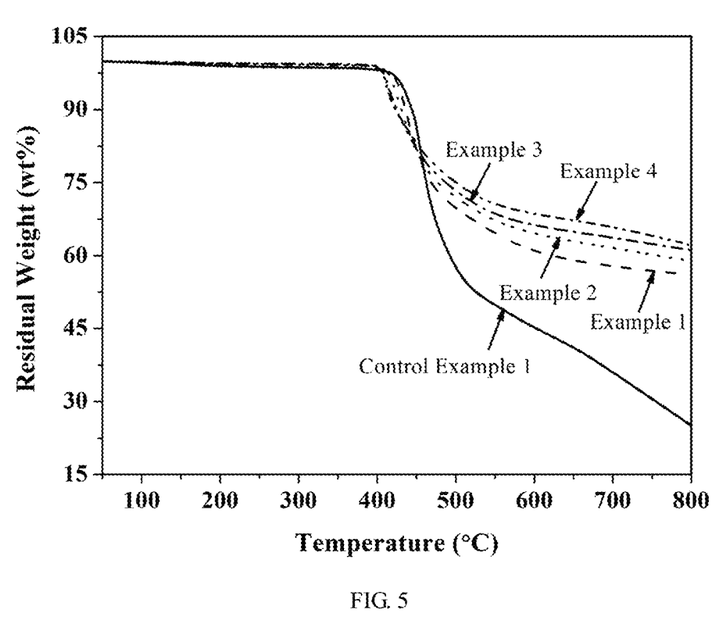
FIG. 5 is thermogravimetric curves under a nitrogen atmosphere of the flame retarding bismaleimide resins prepared in Example 1, 2, 3, 4 and the bismaleimide resin prepared in Control Example 1 of this invention.
Figure 6:
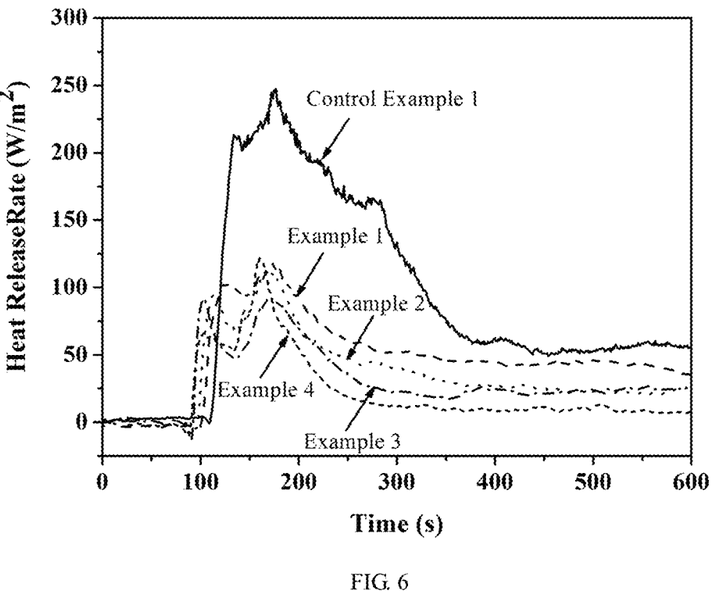
FIG. 6 is heat release rate-time curves from the cone calorimeter tests of the flame retarding bismaleimide resins prepared in Example 1, 2, 3, 4 and the bismaleimide resin prepared in Control Example 1 of this invention.
Figure 7:
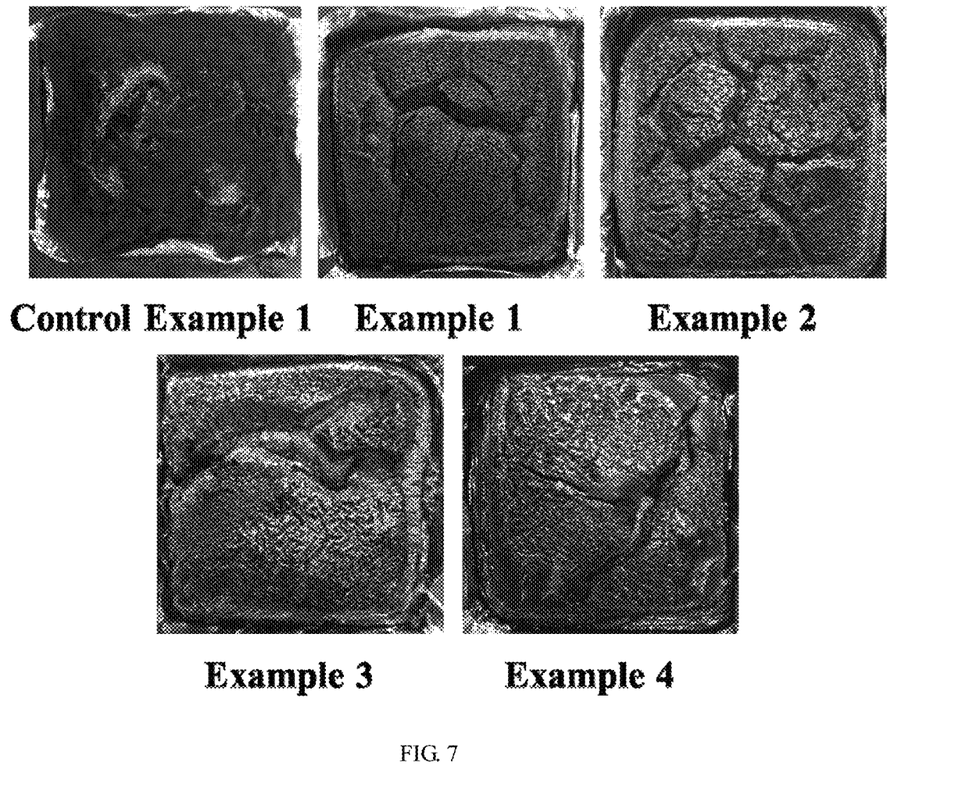
FIG. 7 is digital photos of chars of flame retarding bismaleimide resins after combustion in air prepared in Example 1, 2, 3, 4 and the bismaleimide resin prepared in Control Example 1 of this invention.

2) Preparation of a Flame Retarding Bismaleimide Resin 50.0 g N,N'-(4,4'-methylenediphenyl) dimaleimide, 30.4 g 2,2'-diallyl bisphenol A and 7.6 g bio-based phosphate synthesized in the first section of Example 1 are mixed at 20° C. The mixture is stirred for 30 min at a constant temperature (145° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h+220° C./2 h and 240° C./4 h, successively, after naturally cooling to room temperature, demolding, and then a flame retarding bismaleimide resin is obtained. Its thermogravimetric curves, heat release rate-time curves and digital photos of chars after combustion in air are shown in FIGS. 5, 6 and 7, respectively.

Figure 2:
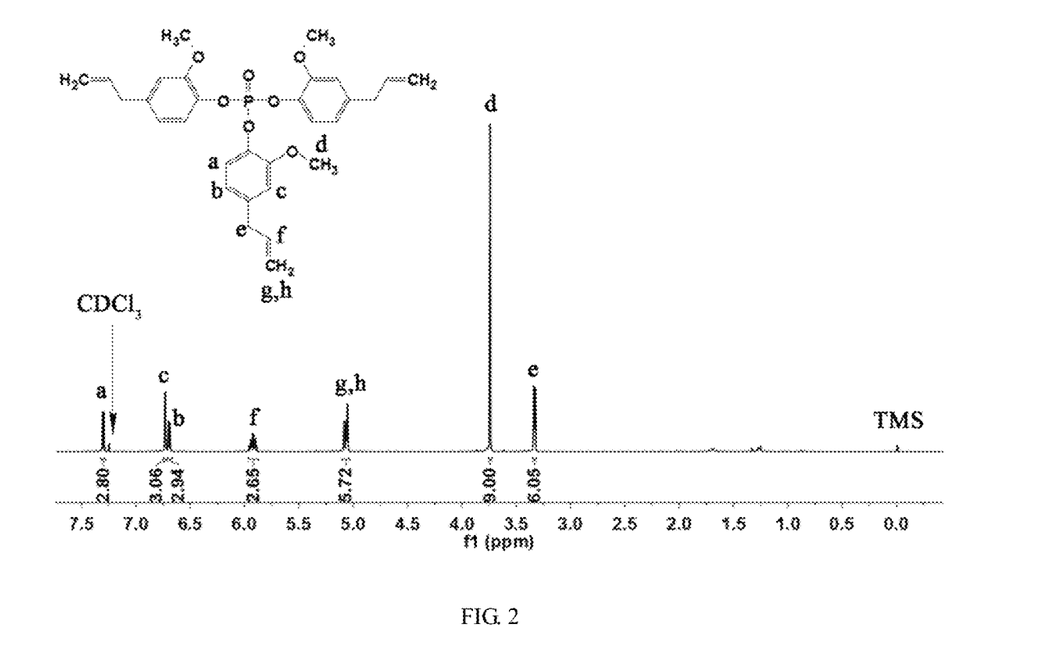
FIG. 2 is $^1$H-NMR spectra of bio-based phosphate synthesized in Example 1 of this invention.

FIG. 2 shows the $^1$H-NMR spectrum of bio-based phosphate prepared in Example 1. 5.92 ppm ($H_f$) and 5.03~5.10 ppm ($H_g$, $H_h$) represent protons of allyl groups of bio-based phosphate; 3.33 ppm ($H_e$) represents the proton of methylene group adjacent to a double bond on allyl groups; 3.74 ppm ($H_d$) represents the proton of methoxy group; 7.30 ppm ($H_a$), 6.73 ppm ($H_c$) and 6.69 ppm ($H_b$) represents the proton of benzene ring.

Figure 3:
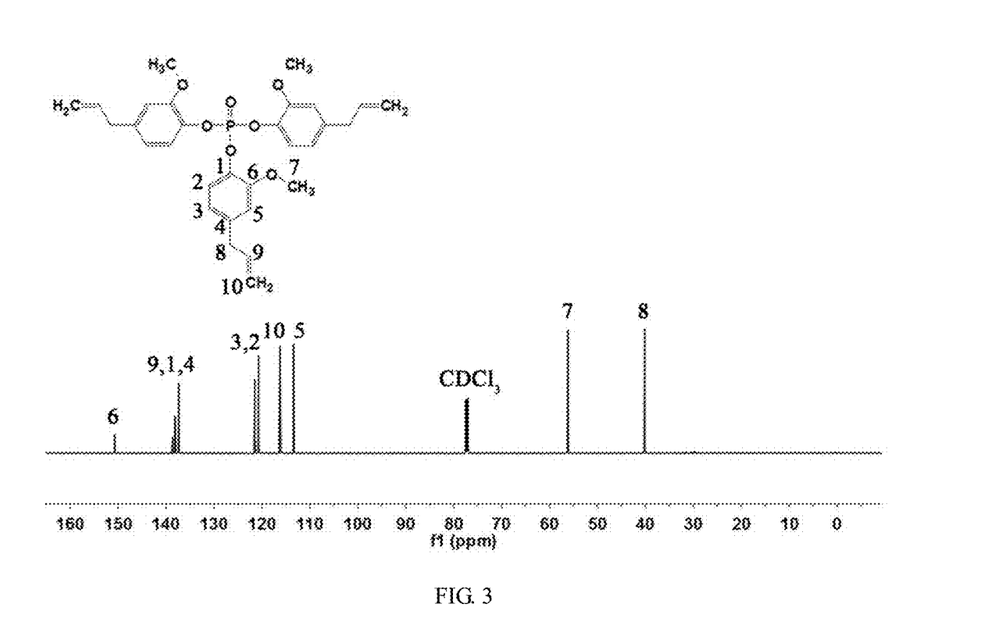
FIG. 3 is $^{13}$C-NMR spectra of bio-based phosphate synthesized in Example 1 of this invention.
Figure 4:
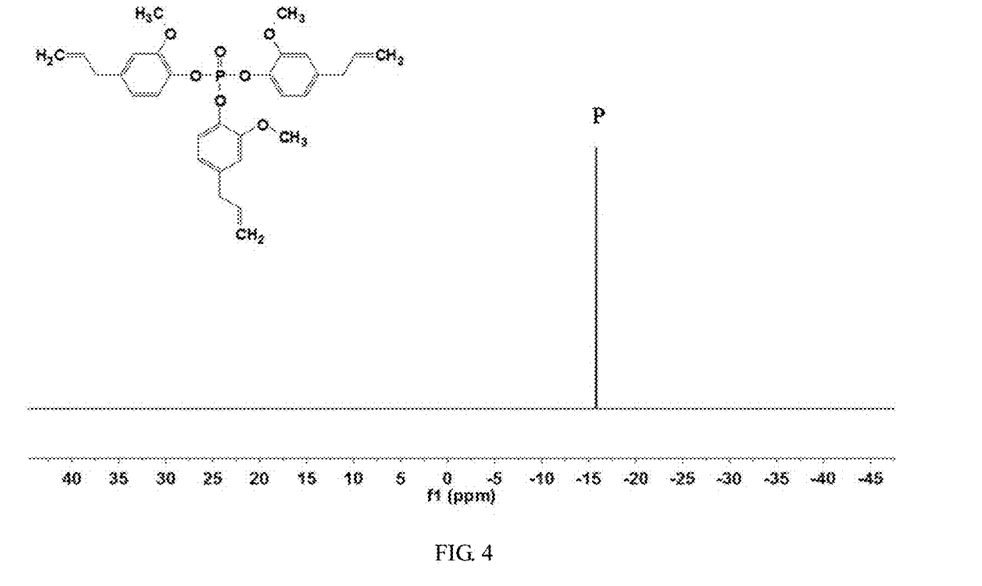
FIG. 4 is $^{31}$P-NMR spectra of bio-based phosphate synthesized in Example 1 of this invention.

FIG. 3 gives the $^{13}$C-NMR spectrum of bio-based phosphate prepared in Example 1. The peaks at 138.62 ppm and 116.19 ppm represent $C_9$ and $C_{10}$ of allyl groups of bio-based phosphate, respectively; the peak at 40.15 ppm represents $C_8$ of methylene group adjacent to a double bond on allyl groups; the peak at 56.14 ppm represents $C_7$ of methoxy group. $C_1$-$C_6$ represent carbon atoms of benzene ring.

FIG. 4 shows the $^{31}$P-NMR spectrum of bio-based phosphate prepared in Example 1. There is a sharp peak at −15.83 ppm, which indicates that there is only one phosphorus atom in the molecular structure, this is consistent with the theory.

Based on above figures, it is reasonable to state that the product prepared in this example is a reactive phosphate with allyl groups.

Example 2

1) Synthesis of Bio-Based Phosphate 42.0 g sodium hydroxide and 13 mL water are mixed in a reaction vessel at 1±0.5° C. to obtain a paste A. 172.4 g eugenol is dissolved in 400 mL dichloromethane to obtain a solution of eugenol dichloromethane, and then the mixture is added dropwise to the paste A with stirring to prepare eugenol salt colloid B. 46.0 g phosphorus oxychloride is dissolved in 250 mL dichloromethane solution to get a phosphorus oxychloride/dichloromethane solution, which is then is slowly drop into above eugenol salt colloid B within 3 h at 0° C. The mixture maintained at 0° C. for 3 h. After the completion of the reaction, 200 g 10% aqueous solution of sodium hydroxide is added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50.0 g N,N'-(4,4'-methylenediphenyl) dimaleimide, 23.7 g 2,2'-diallyl bisphenol A and 15.4 g bio-based phosphate synthesized in the first section of Example 1 are mixed at 20° C. The mixture is stirred for 30 min at a constant temperature (145° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h+220° C./2 h and 240° C./4 h, successively, after naturally cooling to room temperature, demolding, and then a flame retarding bismaleimide resin is obtained. Its thermogravimetric curves, heat release rate-time curves, digital photos of chars after burning in the air and flexural strengths histogram are shown in FIGS. 5, 6 and 7 respectively.

Example 3

1) Synthesis of Bio-Based Phosphate 48.0 g sodium hydroxide and 15 mL water are mixed in a reaction vessel at 1±0.5° C. to obtain a paste A. 197.0 g eugenol is dissolved in 500 mL dichloromethane to obtain a solution of eugenol dichloromethane, and then the mixture is added dropwise to the paste A with stirring to prepare eugenol salt colloid B. 46.0 g phosphorus oxychloride is dissolved in 300 mL dichloromethane solution to get a phosphorus oxychloride/dichloromethane solution, which is then is slowly drop into above eugenol salt colloid B within 4 h at 30° C. The mixture maintained at 30° C. for 4 h. After the completion of the reaction, 300 g 5% aqueous solution of sodium hydroxide is added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50.0 g N,N'-(4,4'-methylenediphenyl) dimaleimide, 9.7 g 2,2'-diallyl bisphenol A and 31.7 g bio-based phosphate synthesized in the first section of Example 1 are mixed at 20° C. The mixture is stirred for 30 min at a constant temperature (145° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h+220° C./2 h and 240° C./4 h, successively, after naturally cooling to room temperature, demolding, and then a flame retarding bismaleimide resin is obtained. Its thermogravimetric curves, heat release rate-time curves, digital photos of chars after burning in the air and flexural strengths histogram are shown in FIGS. 5, 6 and 7 respectively.

Example 4

1) Synthesis of Bio-Based Phosphate 36.0 g sodium hydroxide and 10 mL water are mixed in a reaction vessel at 1±0.5° C. to obtain a paste A. 147.8 g eugenol is dissolved in 300 mL dichloromethane to obtain a solution of eugenol dichloromethane, and then the mixture is added dropwise to the paste A with stirring to prepare eugenol salt colloid B. 46.0 g phosphorus oxychloride is dissolved in 200 mL dichloromethane solution to get a phosphorus oxychloride/dichloromethane solution, which is then is slowly drop into above eugenol salt colloid B within 4 h at 0° C. The mixture maintained at 0° C. for 2 h. After the completion of the reaction, 120 g 20% aqueous solution of sodium hydroxide is added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50.0 g N,N'-(4,4'-methylenediphenyl) dimaleimide and 42.9 g bio-based phosphate synthesized in the first section of Example 1 are mixed at 20° C. The mixture is stirred for 30 min at a constant temperature (145° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h+220° C./2 h and 240° C./4 h, successively, after naturally cooling to room temperature, demolding, and then a flame retarding bismaleimide resin is obtained. Its thermogravimetric curves, heat release rate-time curves, digital photos of chars after burning in the air and flexural strengths histogram are shown in FIGS. 5, 6 and 7 respectively.

Control Example 1, Preparation of Bismaleimide Resin 50.0 g N,N'-(4,4'-methylenediphenyl) dimaleimide and 37.0 g 2,2'-diallyl bisphenol A are mixed at 20° C., and the mixture is stirred for 30 min at a constant temperature (145° C.); the prepolymer is poured into a preheated glass mold and degassed under vacuum at 145° C. for 30 min; after that, the mold is put into an oven for curing and post-curing using the procedures of 150° C./2 h+180° C./2 h+200° C./2 h+220° C./2 h and 240° C./4 h, successively, after naturally cooling to room temperature, demolding, and then a bismaleimide resin is obtained. Its thermogravimetric curves, heat release rate-time curves, digital photos of chars after combustion in air and flexural strength are shown in FIGS. 5, 6, 7 and 8, respectively.

FIG. 5 shows the thermogravimetric curves in a nitrogen atmosphere of the flame retarding bismaleimide resins prepared in Example 1, 2, 3, 4 and the bismaleimide resin prepared in Control Example 1 of this invention. As shown in the figure, the char yields at 800° C. of the flame retarding bismaleimide resins prepared in Example 1, 2, 3, 4 are 56.1 wt %, 58.8 wt %, 61.1 wt % and 62.1 wt %, respectively, which are much higher than that of the bismaleimide resin (25.1 wt %) prepared in Control Example 1.

FIG. 6 shows heat release rate-time curves from cone calorimeter tests of the flame retarding bismaleimide resins prepared in Example 1, 2, 3, 4 and the bismaleimide resin prepared in Control Example 1 of this invention. It can be seen from this figure, the heat release rates and total heat release of the flame retarding bismaleimide resins in Example 1, 2, 3, 4 are much lower than those of the bismaleimide resin prepared in Control Example 1, indicating that the flame retarding bismaleimide resins prepared in Example 1, 2, 3, 4 have excellent flame retardancy.

As is shown in FIG. 7, it gives digital photos of chars after combustion in air of the flame retarding bismaleimide resins prepared in Example 1, 2, 3, 4 and the bismaleimide resin prepared in Control Example 1 of this invention. FIG. 7 shows that the chars of the flame retarding bismaleimide resin prepared in Example 1, 2, 3, 4 are compact, suggesting that these flame retarding bismaleimide resins have good ability of forming chars, and thus playing good flame retardant effect.

Figure 8:
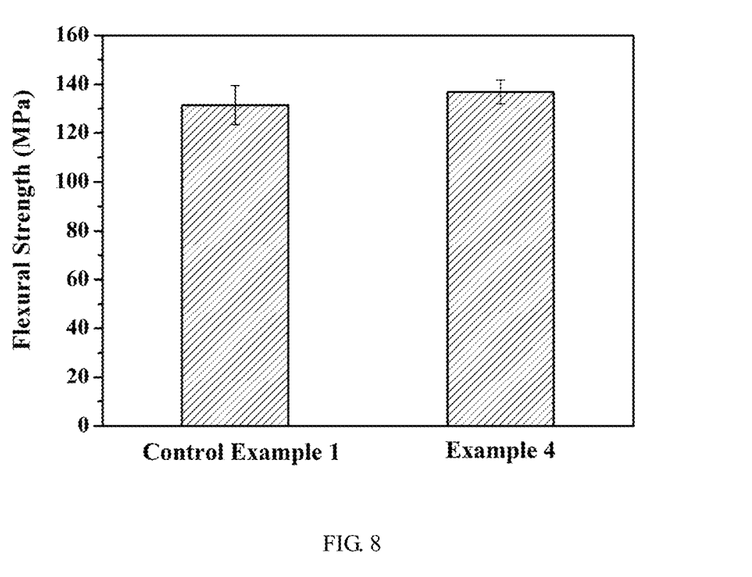
FIG. 8 is flexural strengths of flame retarding bismaleimide resin prepared in Example 4 and the bismaleimide resin prepared in Control Example 1 of this invention.

FIG. 8 gives flexural strengths of the flame retarding bismaleimide resin prepared in Example 4 and the bismaleimide resin prepared in Control Example 1 of this invention. It can be seen from this figure, the flexural strength of flame retarding bismaleimide resin in Example 4 is higher than that of bismaleimide resin in Control Example 1. The flexural strength is usually used to evaluate the overall mechanical properties of a resin, so this figure illustrates that the flame retarding bismaleimide resin has higher mechanical property than the bismaleimide resin prepared in Control Example 1.

Example 5

1) Synthesis of Bio-Based Phosphate 50.4 g potassium hydroxide and 10 mL water are mixed in a reaction vessel at 2±0.5° C. to obtain a paste A. 147.8 g eugenol is dissolved in 300 mL dichloromethane to obtain a solution of eugenol dichloromethane, and then the mixture is added dropwise to the paste A with stirring to prepare eugenol salt colloid B. 46.0 g phosphorus oxychloride is dissolved in 200 mL dichloromethane solution to get a phosphorus oxychloride/dichloromethane solution, which is then is slowly drop into above eugenol salt colloid B within 2 h at 0° C. The mixture maintained at 0° C. for 4 h. After the completion of the reaction, 168 g 20% aqueous solution of potassium hydroxide is added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50.0 g N,N'-(4,4'-methylenediphenyl) dimaleimide, 30.4 g 2,2'-diallyl bisphenol A and 7.6 g bio-based phosphate synthesized in the first section of Example 1 are mixed at 20° C. The mixture is stirred for 30 min at a constant temperature (130° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h+220° C./2 h and 230° C./6 h, successively, after naturally cooling to room temperature, demolding, and then a flame retarding bismaleimide resin is obtained.

Example 6

1) Synthesis of Bio-Based Phosphate 58.8 g potassium hydroxide and 13 mL water are mixed in a reaction vessel at 2±0.5° C. to obtain a paste A. 172.4 g eugenol is dissolved in 400 mL dichloromethane to obtain a solution of eugenol dichloromethane, and then the mixture is added dropwise to the paste A with stirring to prepare eugenol salt colloid B. 46.0 g phosphorus oxychloride is dissolved in 250 mL dichloromethane solution to get a phosphorus oxychloride/dichloromethane solution, which is then is slowly drop into above eugenol salt colloid B within 3 h at 20° C. The mixture maintained at 20° C. for 3 h. After the completion of the reaction, 336 g 10% aqueous solution of potassium hydroxide is added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50.0 g N,N'-(4,4'-methylenediphenyl) dimaleimide, 23.7 g 2,2'-diallyl bisphenol A and 15.4 g bio-based phosphate synthesized in the first section of Example 1 are mixed at 20° C. The mixture is stirred for 30 min at a constant temperature (130° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h+220° C./2 h and 250° C./5 h, successively, after naturally cooling to room temperature, demolding, and then a flame retarding bismaleimide resin is obtained.

Example 7

1) Synthesis of Bio-Based Phosphate 67.2 g potassium hydroxide and 15 mL water are mixed in a reaction vessel at 2±0.5° C. to obtain a paste A. 197.0 g eugenol is dissolved in 500 mL dichloromethane to obtain a solution of eugenol dichloromethane, and then the mixture is added dropwise to the paste A with stirring to prepare eugenol salt colloid B. 46.0 g phosphorus oxychloride is dissolved in 300 mL dichloromethane solution to get a phosphorus oxychloride/dichloromethane solution, which is then is slowly drop into above eugenol salt colloid B within 4 h at 30° C. The mixture maintained at 30° C. for 4 h. After the completion of the reaction, 504 g 5% aqueous solution of potassium hydroxide is added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50.0 g N,N'-(4,4'-methylenediphenyl) dimaleimide, 9.7 g 2,2'-diallyl bisphenol A and 31.7 g bio-based phosphate synthesized in the first section of Example 1 are mixed at 20° C. The mixture is stirred for 30 min at a constant temperature (130° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h and 220° C./12 h, successively, after naturally cooling to room temperature, demolding, and then a flame retarding bismaleimide resin is obtained.

Example 8

1) Synthesis of Bio-Based Phosphate 50.4 g potassium hydroxide and 10 mL water are mixed in a reaction vessel at 2±0.5° C. to obtain a paste A. 147.8 g eugenol is dissolved in 300 mL dichloromethane to obtain a solution of eugenol dichloromethane, and then the mixture is added dropwise to the paste A with stirring to prepare eugenol salt colloid B. 46.0 g phosphorus oxychloride is dissolved in 200 mL dichloromethane solution to get a phosphorus oxychloride/dichloromethane solution, which is then is slowly drop into above eugenol salt colloid B within 4 h at 0° C. The mixture maintained at 0° C. for 2 h. After the completion of the reaction, 168 g 20% aqueous solution of potassium hydroxide is added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50.0 g N,N'-(4,4'-methylenediphenyl) dimaleimide and 42.9 g bio-based phosphate synthesized in the first section of Example 1 are mixed at 25° C. The mixture is stirred for 30 min at a constant temperature (145° C.). The prepolymer is poured into a preheated glass mold and degassed under vacuum at 130° C. for 30 min; after that, the mold is put into an oven for curing and post-curing using the procedures of 150° C./2 h+180° C./2 h+200° C./2 h+220° C./2 h and 230° C./8 h, successively, after naturally cooling to room temperature, demolding, and then a flame retarding bismaleimide resin is obtained.

Example 9

1) Synthesis of Bio-Based Phosphate 36.0 g sodium hydroxide and 10 mL water are mixed in a reaction vessel at 2±0.5° C. to obtain a paste A. 147.8 g eugenol is dissolved in 300 mL trichloromethane to obtain a solution of eugenol trichloromethane, and then the mixture is added dropwise to the paste A with stirring to prepare eugenol salt colloid B. 46.0 g phosphorus oxychloride is dissolved in 200 mL trichloromethane solution to get a phosphorus oxychloride/trichloromethane solution, which is then is slowly drop into above eugenol salt colloid B within 2 h at 0° C. The mixture maintained at 0° C. for 2 h. After the completion of the reaction, 120 g 20% aqueous solution of sodium hydroxide is added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50.0 g N,N'-(4,4'-methylenediphenyl) dimaleimide, 30.4 g 2,2'-diallyl bisphenol A and 7.6 g bio-based phosphate synthesized in the first section of Example 1 are mixed at 25° C. The mixture is stirred for 30 min at a constant temperature (145° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h and 220° C./12 h, successively, after naturally cooling to room temperature, demolding, and then a flame retarding bismaleimide resin is obtained.

Example 10

1) Synthesis of Bio-Based Phosphate 42.0 g sodium hydroxide and 13 mL water are mixed in a reaction vessel at 2±0.5° C. to obtain a paste A. 172.4 g eugenol is dissolved in 400 mL trichloromethane to obtain a solution of eugenol trichloromethane, and then the mixture is added dropwise to the paste A with stirring to prepare eugenol salt colloid B. 46.0 g phosphorus oxychloride is dissolved in 250 mL trichloromethane solution to get a phosphorus oxychloride/trichloromethane solution, which is then is slowly drop into above eugenol salt colloid B within 3 h at 20° C. The mixture maintained at 20° C. for 3 h. After the completion of the reaction, 200 g 10% aqueous solution of sodium hydroxide is added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50.0 g N, N'-(4,4'-diphenyl ether) dimaleimide, 23.7 g 2,2'-diallyl bisphenol A and 15.4 g bio-based phosphate synthesized in the first section of Example 1 are mixed at 25° C. The mixture is stirred for 30 min at a constant temperature (140° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h and 250° C./5 h, successively, after naturally cooling to room temperature, demolding, and then a flame retarding bismaleimide resin is obtained.

Example 11

1) Synthesis of Bio-Based Phosphate 48.0 g sodium hydroxide and 15 mL water are mixed in a reaction vessel at 3±0.5° C. to obtain a paste A. 197.0 g eugenol is dissolved in 500 mL trichloromethane to obtain a solution of eugenol trichloromethane, and then the mixture is added dropwise to the paste A with stirring to prepare eugenol salt colloid B. 46.0 g phosphorus oxychloride is dissolved in 300 mL trichloromethane solution to get a phosphorus oxychloride/trichloromethane solution, which is then is slowly drop into above eugenol salt colloid B within 4 h at 30° C. The mixture maintained at 30° C. for 4 h. After the completion of the reaction, 300 g 5% aqueous solution of sodium hydroxide is added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50.0 g N, N'-(4,4'-diphenyl ether) dimaleimide, 9.7 g 2,2'-diallyl bisphenol A and 31.7 g bio-based phosphate synthesized in the first section of Example 1 are mixed at 30° C. The mixture is stirred for 30 min at a constant temperature (140° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h+220° C./2 h and 240° C./4 h, successively, after naturally cooling to room temperature, demolding, and then a flame retarding bismaleimide resin is obtained.

Example 12

1) Synthesis of Bio-Based Phosphate 50.4 g potassium hydroxide and 10 mL water are mixed in a reaction vessel at 3±0.5° C. to obtain a paste A. 147.8 g eugenol is dissolved in 300 mL trichloromethane to obtain a solution of eugenol trichloromethane, and then the mixture is added dropwise to the paste A with stirring to prepare eugenol salt colloid B. 46.0 g phosphorus oxychloride is dissolved in 200 mL trichloromethane solution to get a phosphorus oxychloride/trichloromethane solution, which is then is slowly drop into above eugenol salt colloid B within 2 h at 0° C. The mixture maintained 0° C. for 2 h. After the completion of the reaction, 168 g 20% aqueous solution of potassium hydroxide is added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50.0 g N, N'-(4,4'-diphenyl ether) dimaleimide and 42.9 g bio-based phosphate synthesized in the first section of Example 1 are mixed at 30° C. The mixture is stirred for 30 min at a constant temperature (145° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h+220° C./2 h and 240° C./4 h, successively, after naturally cooling to room temperature, demolding, and then a flame retarding bismaleimide resin is obtained.

Example 13

1) Synthesis of Bio-Based Phosphate 58.8 g potassium hydroxide and 13 mL water are mixed in a reaction vessel at 3±0.5° C. to obtain a paste A. 172.4 g eugenol is dissolved in 400 mL trichloromethane to obtain a solution of eugenol trichloromethane, and then the mixture is added dropwise to the paste A with stirring to prepare eugenol salt colloid B. 46.0 g phosphorus oxychloride is dissolved in 250 mL trichloromethane solution to get a phosphorus oxychloride/trichloromethane solution, which is then is slowly drop into above eugenol salt colloid B within 3 h at 20° C. The mixture maintained at 20° C. for 3 h. After the completion of the reaction, 336 g 10% aqueous solution of potassium hydroxide is added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 25.0 g N,N'-(4,4'-methylenediphenyl) dimaleimide, 25.0 g N, N'-(4,4'-diphenyl ether) dimaleimide, 42.9 g bio-based phosphate synthesized in the first section of Example 1 are mixed at 30° C. The mixture is stirred for 30 min at a constant temperature (145° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h+220° C./2 h and 230° C./8 h, successively, after naturally cooling to room temperature, demolding, and then a flame retarding bismaleimide resin is obtained.

Example 14

1) Synthesis of Bio-Based Phosphate 67.2 g potassium hydroxide and 15 mL water are mixed in a reaction vessel at 3±0.5° C. to obtain a paste A. 197.0 g eugenol is dissolved in 500 mL trichloromethane to obtain a solution of eugenol trichloromethane, and then the mixture is added dropwise to the paste A with stirring to prepare eugenol salt colloid B. 46.0 g phosphorus oxychloride is dissolved in 300 mL trichloromethane solution to get a phosphorus oxychloride/trichloromethane solution, which is then is slowly drop into above eugenol salt colloid B within 4 h at 30° C. The mixture maintained at 30° C. for 4 h. After the completion of the reaction, 504 g 5% aqueous solution of potassium hydroxide is added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 25.0 g N,N'-(4,4'-methylenediphenyl) dimaleimide, 25.0 g N, N'-(4,4'-diphenyl ether) dimaleimide, 42.9 g bio-based phosphate synthesized in the first section of Example 1 are mixed at 30° C. The mixture is stirred for 30 min at a constant temperature (130° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h and 250° C./5 h, successively, after naturally cooling to room temperature, demolding, and then a flame retarding bismaleimide resin is obtained.

Example 15

1) Synthesis of Bio-Based Phosphate 18 g sodium hydroxide, 25.2 g potassium hydroxide and 10 mL water are mixed in a reaction vessel at 10° C. to obtain a paste A. 147.8 g eugenol is dissolved in 300 mL dichloromethane to obtain a solution of eugenol dichloromethane, and then the mixture is added dropwise to the paste A with stirring to prepare eugenol salt colloid B. 46.0 g phosphorus oxychloride is dissolved in 200 mL dichloromethane solution to get a phosphorus oxychloride/dichloromethane solution, which is then is slowly drop into above eugenol salt colloid B within 2 h at 0° C. The mixture maintained at 0° C. for 2 h. After the completion of the reaction, 60 g 10% aqueous solution of sodium hydroxide and 84 g 10% aqueous solution of potassium hydroxide are added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 25.0 g N,N'-(4,4'-methylenediphenyl) dimaleimide, 25.0 g N, N'-(4,4'-diphenyl ether) dimaleimide, 42.9 g bio-based phosphate synthesized in the first section of Example 1 are mixed at 20° C. The mixture is stirred for 30 min at a constant temperature (130° C.). The prepolymer is poured into a preheated glass mold and degassed under vacuum at 145° C. for 30 min; after that, the mold is put into an oven for curing and post-curing using the procedures of 150° C./1 h+170° C./2 h+190° C./2 h+210° C./2 h and 230° C./10 h, successively, after naturally cooling to room temperature, demolding, and then a flame retarding bismaleimide resin is obtained.

Example 16

1) Synthesis of Bio-Based Phosphate 24 g sodium hydroxide, 33.6 g potassium hydroxide and 15 mL water are mixed in a reaction vessel at 4±0.5° C. to obtain a paste A. 197.0 g eugenol is dissolved in 300 mL dichloromethane to obtain a solution of eugenol dichloromethane, and then the mixture is added dropwise to the paste A with stirring to prepare eugenol salt colloid B. 46.0 g phosphorus oxychloride is dissolved in 300 mL dichloromethane solution to get a phosphorus oxychloride/dichloromethane solution, which is then is slowly drop into above eugenol salt colloid B within 4 h at 30° C. The mixture maintained 30° C. for 4 h. After the completion of the reaction, 180 g 10% aqueous solution of sodium hydroxide and 252 g 10% aqueous solution of potassium hydroxide are added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50.0 g N,N'-(4,4'-methylenediphenyl) dimaleimide, 30.4 g 2-2'-diallyl bisphenol A and 7.6 g bio-based phosphate synthesized in the first section of Example 1 are mixed at 25° C. The mixture is stirred for 30 min at a constant temperature (130° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h and 220° C./8 h, successively, after naturally cooling to room temperature, demolding, and then a flame retarding bismaleimide resin is obtained.

Example 17

1) Synthesis of Bio-Based Phosphate 21 g sodium hydroxide, 29.4 g potassium hydroxide and 13 mL water are mixed in a reaction vessel at 4±0.5° C. to obtain a paste A. 172.4 g eugenol is dissolved in 400 mL dichloromethane to obtain a solution of eugenol dichloromethane, and then the mixture is added dropwise to the paste A with stirring to prepare eugenol salt colloid B. 46.0 g phosphorus oxychloride is dissolved in 250 mL dichloromethane solution to get a phosphorus oxychloride/dichloromethane solution, which is then is slowly drop into above eugenol salt colloid B within 3 h at 20° C. The mixture maintained at 20° C. for 3 h. After the completion of the reaction, 120 g 20% aqueous solution of sodium hydroxide and 168 g 20% aqueous solution of potassium hydroxide are added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50.0 g N,N'-(4,4'-methylenediphenyl) dimaleimide, 42.9 g bio-based phosphate synthesized in the first section of Example 1 are mixed at 30° C. The mixture is stirred for 30 min at a constant temperature (145° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h and 220° C./8 h, successively, after naturally cooling to room temperature, demolding, and then a flame retarding bismaleimide resin is obtained.

Example 18

1) Synthesis of Bio-Based Phosphate 18 g sodium hydroxide, 25.2 g potassium hydroxide and 10 mL water are mixed in a reaction vessel at 4±0.5° C. to obtain a paste A. 147.8 g eugenol is dissolved in 300 mL trichloromethane to obtain a solution of eugenol trichloromethane, and then the mixture is added dropwise to the paste A with stirring to prepare eugenol salt colloid B. 46.0 g phosphorus oxychloride is dissolved in 200 mL trichloromethane solution to get a phosphorus oxychloride/trichloromethane solution, which is then is slowly drop into above eugenol salt colloid B within 2 h at 0° C. The mixture maintained at 0° for 2 h. After the completion of the reaction, 60 g 10% aqueous solution of sodium hydroxide and 84 g 10% aqueous solution of potassium hydroxide are added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50.0 g N,N'-(4,4'-methylenediphenyl) dimaleimide, 42.9 g bio-based phosphate synthesized in the first section of Example 1 are mixed at 30° C. The mixture is stirred for 30 min at a constant temperature (145° C.). The prepolymer is poured into a preheated glass mold and degassed under vacuum at 130° C. for 30 min; after that, the mold is put into an oven for curing and post-curing using the procedures of 150° C./2 h+180° C./2 h+200° C./2 h and 220° C./8 h, successively, after naturally cooling to room temperature, demolding, and then a flame retarding bismaleimide resin is obtained.

Example 19

1) Synthesis of Bio-Based Phosphate 24 g sodium hydroxide, 33.6 g potassium hydroxide and 15 mL water are mixed in a reaction vessel at 3±0.5° C. to obtain a paste A. 197 g eugenol is dissolved in 300 mL trichloromethane to obtain a solution of eugenol trichloromethane, and then the mixture is added dropwise to the paste A with stirring to prepare eugenol salt colloid B. 46.0 g phosphorus oxychloride is dissolved in 300 mL trichloromethane solution to get a phosphorus oxychloride/trichloromethane solution, which is then is slowly drop into above eugenol salt colloid B within 4 h at 30° C. The mixture maintained at 30° for 4 h. After the completion of the reaction, 180 g 10% aqueous solution of sodium hydroxide and 252 g 10% aqueous solution of potassium hydroxide are added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 25 g N,N'-(4,4'-methylenediphenyl) dimaleimide and 25 g N, N'-(4,4'-diphenyl ether) dimaleimide, 42.9 g bio-based phosphate synthesized in the first section of Example 1 are mixed at 30° C. The mixture is stirred for 30 min at a constant temperature (145° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h and 220° C./8 h, successively, after naturally cooling to room temperature, demolding, and then a flame retarding bismaleimide resin is obtained.

Example 20

1) Synthesis of Bio-Based Phosphate 24 g sodium hydroxide, 33.6 g potassium hydroxide and 15 mL water are mixed in a reaction vessel at 1±0.5° C. to obtain a paste A. 197 g eugenol is dissolved in 300 mL trichloromethane to obtain a solution of eugenol dichloromethane, and then the mixture is added dropwise to the paste A with stirring to prepare eugenol salt colloid B. 46.0 g phosphorus oxychloride is dissolved in 150 mL dichloromethane and 150 mL trichloromethane solution to get phosphorus oxychloride solution and then it is slowly drop into the eugenol salt colloid B within 4 h at 30° C. The mixture maintained at 30° for 4 h. After the completion of the reaction, 180 g 10% aqueous solution of sodium hydroxide and 252 g 10% aqueous solution of potassium hydroxide are added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50 g N, N'-(4,4'-diphenyl ether) dimaleimide, 42.9 g bio-based phosphate synthesized in the first section of Example 1 are mixed at 20° C. The mixture is stirred for 30 min at a constant temperature (145° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h+220° C./2 h and 240° C./4 h, successively, after naturally cooling to room temperature, demolding, and then a flame retarding bismaleimide resin is obtained.

Example 21

1) Synthesis of Bio-Based Phosphate 24 g sodium hydroxide, 33.6 g potassium hydroxide and 15 mL water are mixed in a reaction vessel at 2±0.5° C. to obtain a paste A. 197 g eugenol is dissolved in 300 mL trichloromethane to obtain a solution of eugenol dichloromethane, and then the mixture is added dropwise to the paste A with stirring to prepare eugenol salt colloid B. 46.0 g phosphorus oxychloride is dissolved in 150 mL dichloromethane and 150 mL trichloromethane solution to get phosphorus oxychloride solution and then it is slowly drop into the eugenol salt colloid B in 3 h at 30° C. The mixture maintained at 30° for 3 h. After the completion of the reaction, 180 g 10% aqueous solution of sodium hydroxide and 252 g 10% aqueous solution of potassium hydroxide are added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50 g N,N'-(4,4'-methylenediphenyl) dimaleimide, 55.5 g bio-based phosphate synthesized in the first section of Example 1 are mixed at 20° C. The mixture is stirred for 30 min at a constant temperature (145° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h+220° C./2 h and 240° C./4 h, successively, after naturally cooling to room temperature, demolding, and then a flame retarding bismaleimide resin is obtained.

Example 22

1) Synthesis of Bio-Based Phosphate 24 g sodium hydroxide, 33.6 g potassium hydroxide and 15 mL water are mixed in a reaction vessel at 3±0.5° C. to obtain a paste A. 197 g eugenol is dissolved in 300 mL trichloromethane to obtain a solution of eugenol dichloromethane, and then the mixture is added dropwise to the paste A with stirring to prepare eugenol salt colloid B. 46.0 g phosphorus oxychloride is dissolved in 150 mL dichloromethane and 150 mL trichloromethane solution to get phosphorus oxychloride solution and then it is slowly drop into the eugenol salt colloid B within 2 h at 30° C. The mixture maintained at 30° for 2 h. After the completion of the reaction, 180 g 10% aqueous solution of sodium hydroxide and 252 g 10% aqueous solution of potassium hydroxide are added to the reaction vessel to remove unreacted eugenol and produced sodium chloride. The organic layer is separated by extraction, followed by washing with saturated brine and drying with anhydrous sodium sulfate, successively. Finally, a light yellow liquid is obtained through removing the solvent under reduced pressure, which is bio-based phosphate flame retardant.

2) Preparation of a Flame Retarding Bismaleimide Resin 50 g N,N'-(4,4'-methylenediphenyl) dimaleimide, 36.4 g 2-2'-diallyl bisphenol A and 0.7 g bio-based phosphate synthesized in the first section of Example 1 are mixed at 20° C. The mixture is stirred for 30 min at a constant temperature (130° C.). The prepolymer is poured into a preheated glass mold and degassed under vacuum at 145° C. for 30 min; after that, the mold is put into an oven for curing and post-curing using the procedures of 150° C./2 h+180° C./2 h+200° C./2 h and 220° C./8 h, successively, after naturally cooling to room temperature, demolding, and then a flame retarding bismaleimide resin is obtained.

What we claim:

1. A preparation method of flame retardant bismaleimide resin, characterizing in comprising the following steps:
    (1) at a temperature of 0.5 to 4.5° C., by mole basis, 300 to 400 parts of alkali metal alkali and 180 to 280 parts of water are uniformly mixed to obtain a paste A; 300 to 400 parts of eugenol is dissolved in 1500 to 2600 parts of methyl chloride to obtain a eugenol methyl chloride solution, which is then added dropwise to the paste A under stirring to obtain eugenol salt colloid B; 100 parts of phosphorus oxychloride is dissolved in 800 to 1600 parts of methyl chloride to get phosphorus oxychloride solution, which is then slowly dropped into said eugenol salt colloid B within 2 to 4 h at 0 to 30° C.; the mixture continues to react for 2 to 4 h; the organic layer is extracted by alkali metal alkali solution, followed by washing, drying and removing the solvent by rotary evaporation, successively, to get a light yellow liquid, which is bio-based phosphate flame retardant;
    (2) at a temperature 20 to 30° C., by mole basis, 100 parts of bismaleimide, 0 to 84.5 parts of 2,2'-diallyl bisphenol A, and 1 to 75 parts of bio-based phosphate are mixed, the mixture is stirred at a constant temperature of 130 to 145° C. to get a transparent liquid, which is then cured and post-cured to obtain a flame retarding bismaleimide resin.

2. The preparation method of flame retardant bismaleimide resin according to claim 1, wherein said alkali metal alkali is one of sodium hydroxide, potassium hydroxide, or any combination thereof.

3. The preparation method of flame retardant bismaleimide resin according to claim 1, wherein said methyl chloride is one of dichloromethane, trichloromethane, or any combination thereof.

4. The preparation method of flame retardant bismaleimide resin according to claim 1, wherein said bismaleimide is one of N,N'-(4,4'-methylenediphenyl) dimaleimide, N, N'-(4,4'-diphenyl ether) dimaleimide, or any combination thereof.

5. A flame-retardant bismaleimide resin prepared by the preparation method according to claim 1.

* * * * *